(12) United States Patent
Stearns et al.

(10) Patent No.: US 7,568,308 B2
(45) Date of Patent: Aug. 4, 2009

(54) SOIL PROTECTION DEVICE

(76) Inventors: Brian Ronald Stearns, 12465 Julian Ct., Broomfield, CO (US) 80020; Leigh Ann Stearns, 12465 Julian Ct., Broomfield, CO (US) 80020

( * ) Notice: Subject to any disclaimer, the term of this patent is extended or adjusted under 35 U.S.C. 154(b) by 187 days.

(21) Appl. No.: 11/302,905

(22) Filed: Dec. 14, 2005

(65) Prior Publication Data

US 2007/0130825 A1     Jun. 14, 2007

(51) Int. Cl.
*A01G 9/00* (2006.01)
*A01G 13/02* (2006.01)

(52) U.S. Cl. ............................ 47/32; 47/31.1; 47/20.1

(58) Field of Classification Search ................ 47/31.1, 47/32, 21.1, 20.1, 25.1, 29.5, 32.4, 32.5, 47/32.7, 32.8, 33, 65.5, 66.3, 66.4, 66.1, 47/9

See application file for complete search history.

(56) References Cited

U.S. PATENT DOCUMENTS

| | | | |
|---|---|---|---|
| 915,897 A * | 3/1909 | Skorness | 47/32 |
| 3,961,443 A | 6/1976 | Insalaco | |
| 4,216,622 A * | 8/1980 | Hollenbach et al. | 47/71 |
| 4,395,845 A | 8/1983 | Markowitz | |
| 5,184,421 A * | 2/1993 | Meharg | 47/65.5 |
| 5,605,009 A | 2/1997 | Elder | |
| 5,711,106 A * | 1/1998 | Ellis | 47/32 |
| 5,725,297 A * | 3/1998 | Crowder et al. | 362/84 |
| 5,918,411 A | 7/1999 | Hadrava | |

* cited by examiner

*Primary Examiner*—Michael R Mansen
*Assistant Examiner*—Monica L Williams
(74) *Attorney, Agent, or Firm*—Dale J. Ream

(57) ABSTRACT

A soil protection device for inhibiting access to soil surrounding a stem of a potted plant will now be described in detail with reference to FIGS. 1*a* to 4 of the accompanying drawings. According to the now preferred embodiment, a soil protection device 10 includes a cover member 20 having a generally disk-shaped configuration for lying flat upon soil surrounding a potted plant. While the cover member 20 may include a one-piece construction, the now preferred embodiment includes having first portion 30 pivotally connected to a second portion 40 for relative movement between an open configuration (FIG. 1*a*) and a closed configuration (FIG. 1*a*). Each portion includes a generally hemispherical configuration such that the cover member 20 presents a disk-shaped configuration when the portions are at the closed configuration. Of course, other configurations would also be suitable depending on the geometry of plant receptacle with which it is being used, e.g. a square or rectangular configuration.

8 Claims, 5 Drawing Sheets

SOIL PROTECTION DEVICE

BACKGROUND OF THE INVENTION

The present invention relates generally to gardening accessories and, more particularly, to a soil protection device for inhibiting young children and animals from accessing the soil surrounding a plant in a flower pot or other plant receptacle.

One challenge faced by many parents is keeping their young children from playing in the dirt and, particularly, from playing in the loose soil surrounding potted plants. Similarly, pets often dig in the soil surrounding potted plants.

Various devices are known in the art for covering the soil surrounding potted plants. Although assumably effective for their intended purposes, the existing devices do not provide a soil cover that allows the soil to be effectively watered and do not provide an adjustable stem opening.

Therefore, it would be desirable to have a soil protection device having a cover member with a plurality of expansion sections that may be selectively removed to enlarge a diameter of a stem hole through which a plant stem may extend. Further, it would be desirable to have a soil protection device through which water may freely pass while still protecting the soil from disturbance.

SUMMARY OF THE INVENTION

A soil protection device for inhibiting access to soil surrounding a stem of a potted plant includes a cover member having first and second portions pivotally coupled together and movable between a closed configuration surrounding a plant stem and an open configuration in which the cover member may be removed from about the plant stem. The cover member defines a stem hole at a juncture between the first and second portions through which the plant stem may extend. The cover member defines a plurality of apertures through which water may pass through to the soil beneath the cover member.

The cover member further includes a plurality of perforations, also referred to as lines of weakness. These lines of weakness are arranged concentrically about the stem hole so as to form a plurality of expansion sections. Each perforated line may be severed, whether by a sharp tool like scissors or by bending by a user. When a line is severed, an expansion section may be removed so as to enlarge the diameter of the stem hole. This utility enables the soil protector to be adapted for use with plants of different stem sizes or with the same plant as its stem grows over time.

Therefore, a general object of this invention is to provide a soil protection device for inhibiting access or disturbance of soil surrounding a stem of a plant potted in a plant container.

Another object of this invention is to provide a soil protection device, as aforesaid, having a cover member which may be pivotally opened or closed for easy placement or removal from a position surrounding a potted plant stem.

Still another object of this invention is to provide a soil protection device, as aforesaid, defining a plurality of apertures for receiving water therethrough.

Yet another object of this invention is to provide a soil protection device, as aforesaid, defining a plurality of perforations for separating a cover member into expansion sections.

A further object of this invention is to provide a soil protection device, as aforesaid, defining a central stem hole through which a plant stem may extend.

A still further object of this invention is to provide a soil protection device, as aforesaid, in which the lines of weakness may be selectively severed for selective removal of an expansion section and, thus, for enlarging a diameter of the stem hole.

Other object and advantages of the present invention will become apparent from the following description taken in connection with the accompanying drawings, wherein is set forth by way of illustration and example, an embodiment of this invention.

DETAILED DESCRIPTION OF THE PREFERRED EMBODIMENT

A soil protection device for inhibiting access to soil surrounding a stem of a potted plant will now be described in detail with reference to FIGS. 1a to 4 of the accompanying drawings. According to the now preferred embodiment, a soil protection device 10 includes a cover member 20 having a generally disk-shaped configuration for lying flat upon soil surrounding a potted plant. While the cover member 20 may include a one-piece construction, the now preferred embodiment includes having first portion 30 pivotally connected to a second portion 40 for relative movement between an open configuration (FIG. 1a) and a closed configuration (FIG. 1b). Each portion includes a generally hemispherical configuration such that the cover member 20 presents a disk-shaped configuration when the portions are at the closed configuration. Of course, other configurations would also be suitable depending on the geometry of a plant receptacle with which it is being used, e.g. a square or rectangular configuration.

Figure 3A:
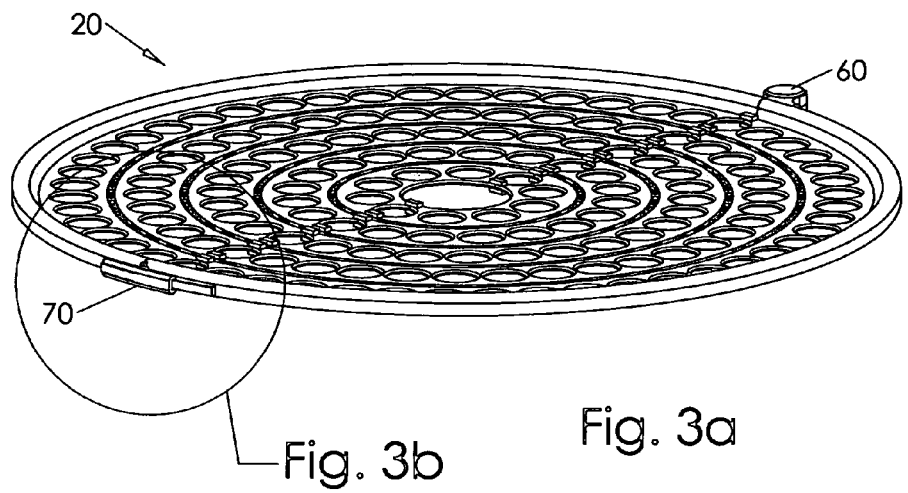
FIG. 3a is another perspective view of the soil protection device as in FIG. 1b.
Figure 3B:
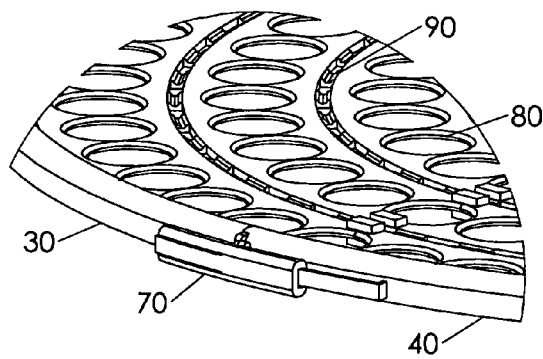
FIG. 3b is an isolated view on an enlarged scale taken from FIG. 3a showing a closure member in a secured configuration.
Figure 3C:
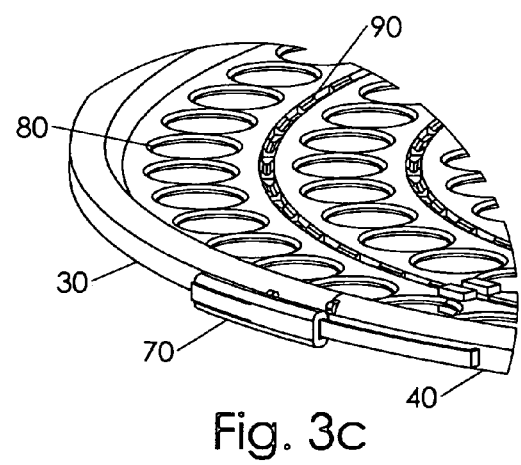
FIG. 3c is another isolated view on an enlarged scale showing a closure member in an unsecured configuration.

At the closed configuration, the cover member 20 defines a stem hole 50 having a generally circular configuration (FIG. 1b). As can be best seen in FIG. 2, each portion of the cover member 20 defines a portion of the stem hole 50, the stem hole portions being situated along respective linear edges thereof. The first 30 and second 40 portions are pivotally connected along a junction of their respective peripheral edges with a pivotal fastener 60, such as a hinge or the like. The pivotal connection enables the first 30 and second 40 portions to be separated and then reconnected with a plant stem extending upward through the stem hole 50. Complementary flanges 32, 42 may be situated along the generally linear inner edges of each portion for securely joining the portions at the closed configuration. A latch assembly 70 is attached to the outer peripheral edges of the cover member portions opposite the pivotal fastener 60 for selectively holding the cover member 20 at the closed configuration or releasing it therefrom. FIGS. 3b and 3c show the latch assembly in secured and unsecured configurations, respectively.

Figure 1A:
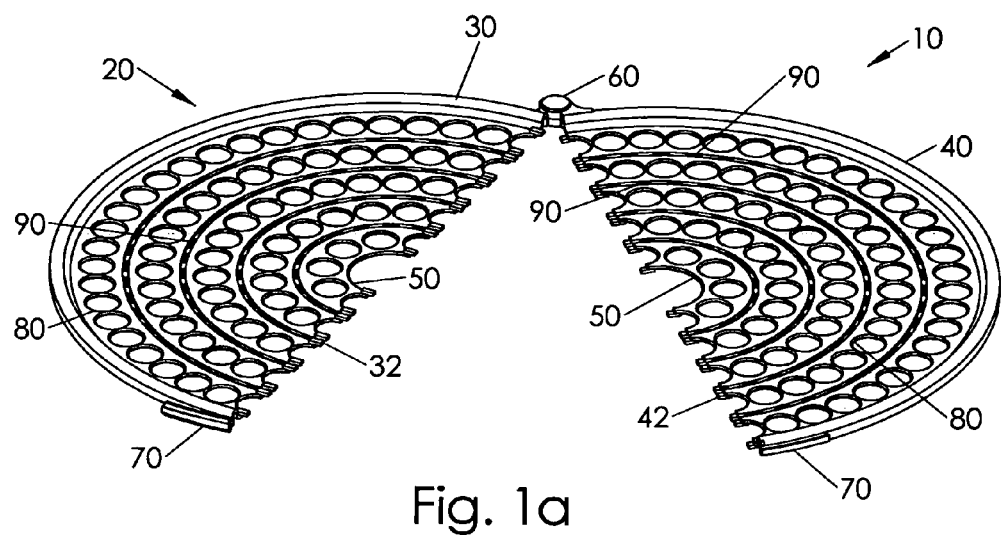
FIG. 1a is a perspective view of a soil protection device in an open configuration according to a preferred embodiment of the present invention.
Figure 1B:
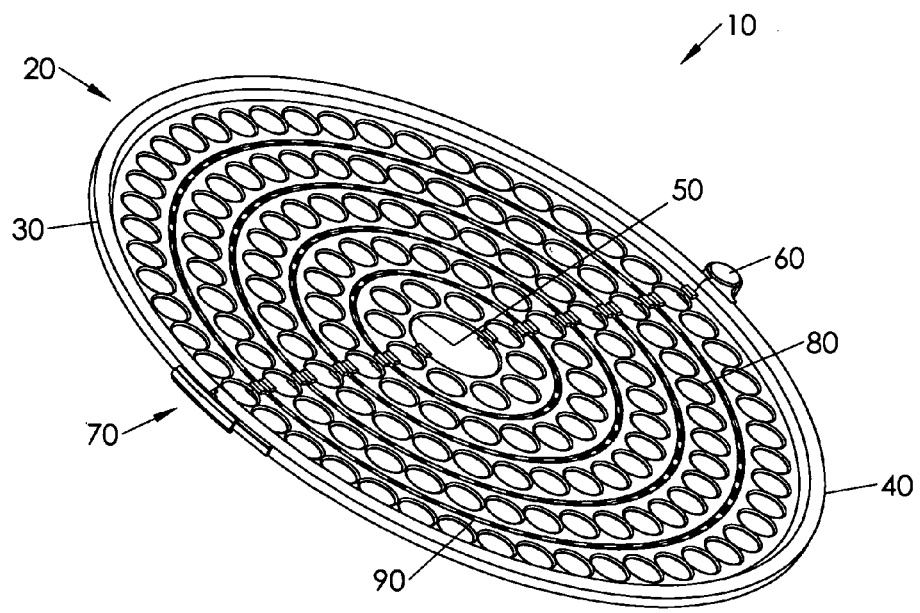
FIG. 1b is a perspective view of the soil protection device as in FIG. 1a in a closed configuration.
Figure 2:
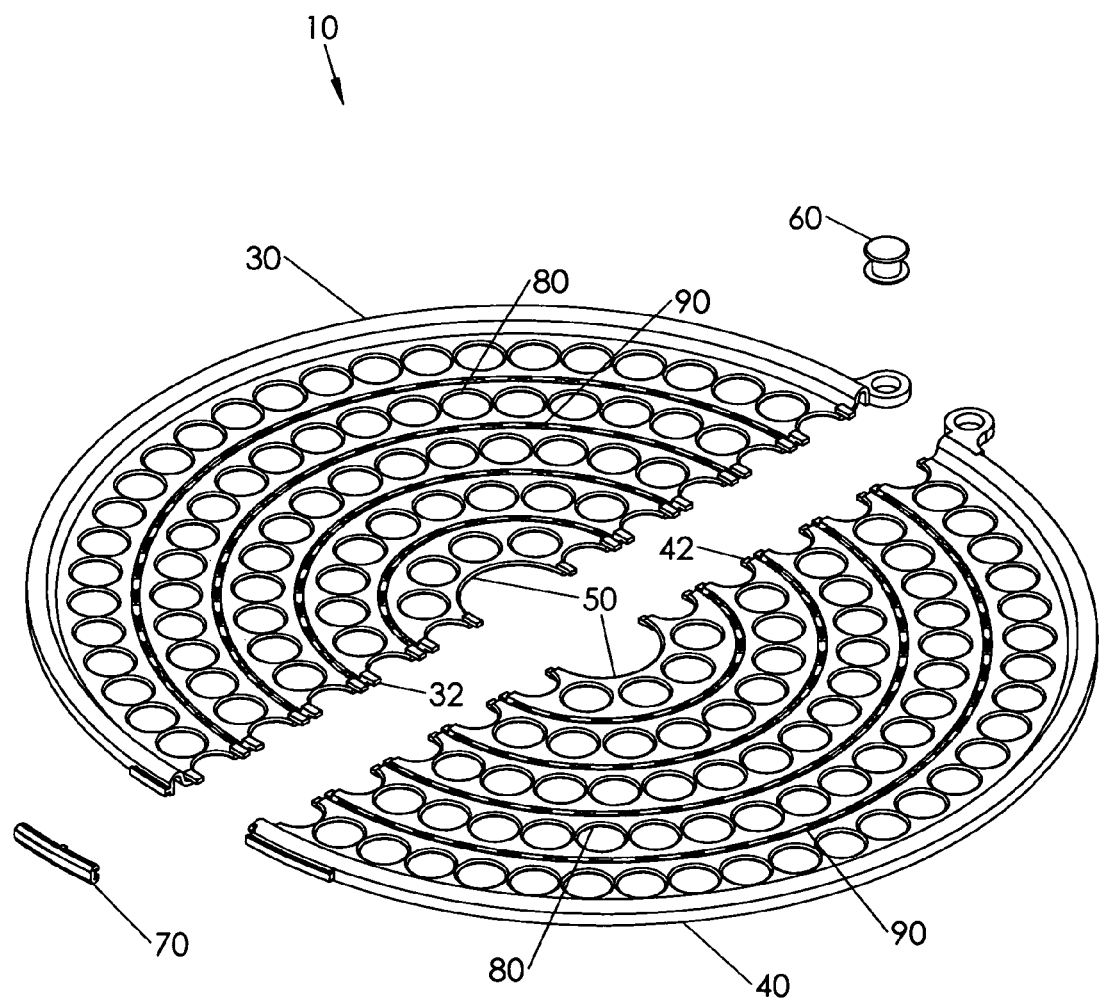
FIG. 2 is an exploded view of the soil protection device as in FIG. 1b.

As clearly shown in FIGS. 1a and 1b, the cover member 20 includes a generally circular configuration and each of the first 30 and second 40 portions includes a generally hemispherical configuration. Accordingly, each cover portion includes an outer edge extending about the generally arcuate circumference of the respective cover portion, this edge also being referred to as a respective circumferential edge. A linear edge extends between end points of each circumferential edge. The linear edges generally bear against one another at the closed configuration (FIG. 1b) and are completely displaced from one another at the open configuration (FIG. 1a).

The cover member 20 defines a plurality of apertures 80 spaced apart from one another for allowing water to pass therethrough (FIG. 1b). The apertures 80 allows a user to water the plant in a pot without removing or even moving the soil protection device. Preferably, the plurality of apertures 80 are arranged concentrically relative to the stem hole and each aperture includes a circular configuration although other configurations and geometries would also be suitable.

Further, the cover member 20 includes a plurality of perforations 90 arranged concentrically about the central stem hole 50. This concentric arrangement forms a plurality of expansion sections, as to be described below. These perforations 90 are also referred to as lines of weakness in that they represent points at which the cover member material may be bent, broken, and completely severed. The cover member 20 may be constructed of plastic so that these points of weakness can be severed by hand or with a common cutting tool such as scissors. Of course, the filter may be constructed of a metal grate material which may also allow breakage through bending or cutting. Manual manipulation of each cover member portion would be most feasible at an open configuration, as in FIG. 1a.

Figure 4:
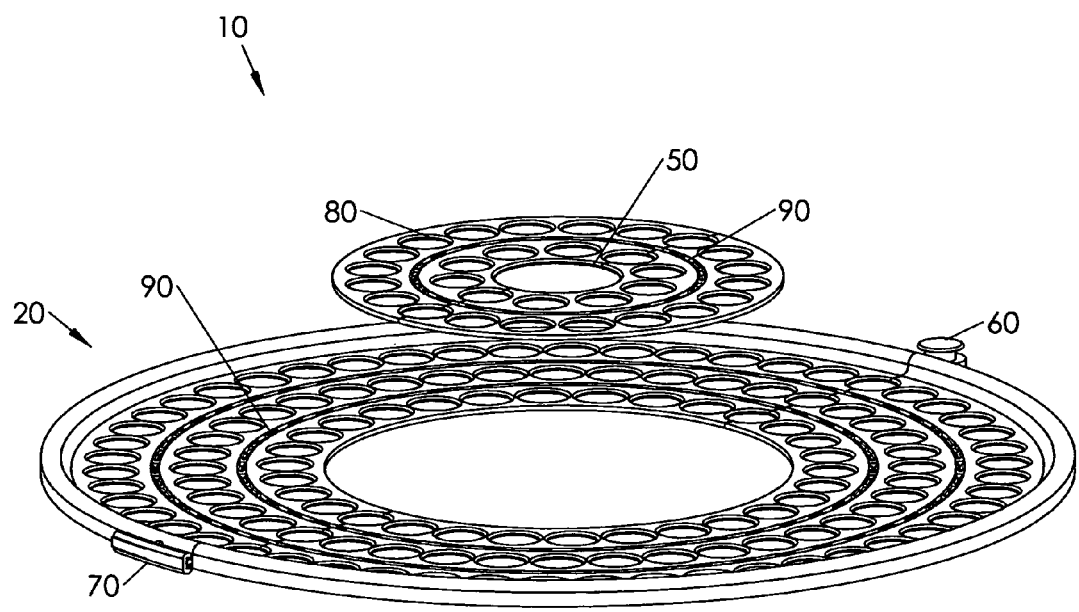
FIG. 4 is yet another perspective view of the soil protection device with one expansion section being removed along a selective line of weakness.
Figure 4B:
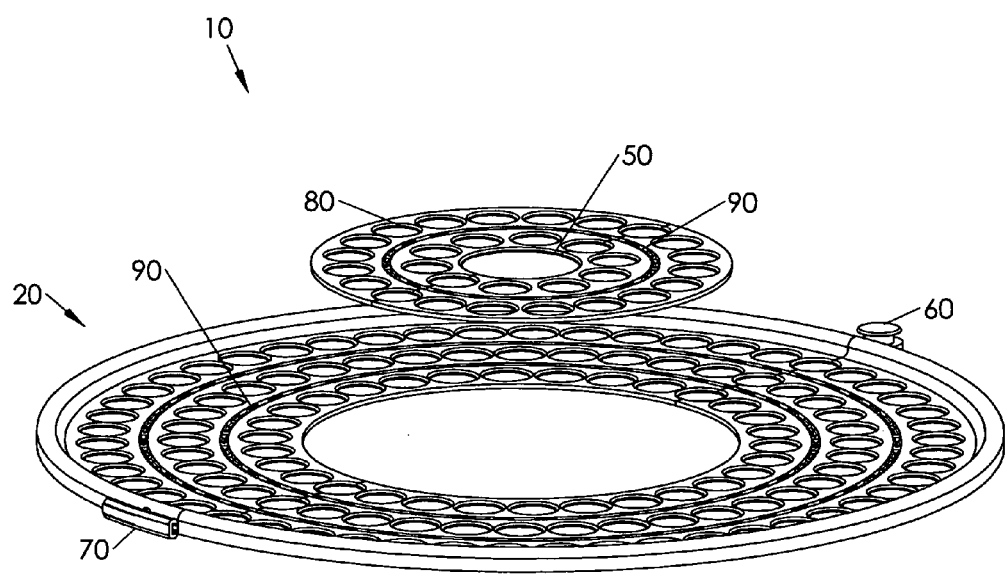

Portions of the cover member portions (e.g. expansion sections) may be selectively removed along selected lines of perforation 90 (FIG. 4). In removing an expansion section, a diameter of the stem hole is substantially increased. A section is most easily removed by first pivotally opening the cover member 20 (FIG. 1a) and then severing a selected line of perforations 90 from each cover member portion 30, 40. Removal of an expansion section may be useful if the plant stem has grown substantially over time or if a soil protection device 10 is being used with a different plant having a significantly larger stem diameter.

In use, the soil protection device 10 may be situated atop the soil surrounding a potted plant with the plant stem extending through the stem hole 50. For small plants and flowers, a soil protection device having a cover member with a singular construction would be suitable in that the stem may be easily threaded through the stem hole with no need to have a pivotally openable construction. However, the soil protection device 10 preferably includes a two-piece cover member 20 that may be opened (FIG. 1a) and situated about a plant stem and then moved to the closed configuration (FIG. 1b). If the plant stem is of a larger size or as the stem grows over time, a selected line of perforations 90 may be severed as described above so as to enlarge the stem hole (FIG. 4).

Accordingly, it can be seen that the soil protection device protects the soil of a potted plant from being disturbed by children and pets while still allowing the plant to be conveniently watered. This device also provides great flexibility for use with plants having varying stem diameters and for adapting to the size changes of a growing plant.

It is understood that while certain forms of this invention have been illustrated and described, it is not limited thereto except insofar as such limitations are included in the following claims and allowable functional equivalents thereof.

Having thus described the invention, what is claimed as new and desired to be Secured by Letters Patent is as follows:

1. A soil protection device for inhibiting access to soil surrounding a stem of a plant potted in a plant receptacle, said soil protection device comprising:
   a cover member having a first portion and a second portion releasably and pivotally connected to said first portion for relative movement between a closed configuration and an open configuration;
   wherein said cover member defines a stem hole situated generally at a junction between said first and second portions when said first and second portions are at said closed configuration, said stem hole having a configuration for allowing the plant stem to extend therethrough;
   wherein said first and second portions each include a circumferential edge having an arcuate configuration and a linear edge extending between end points of said circumferential edge, respective linear edges bearing against one another at said closed configuration and being completely displaced from one another at said open configuration;
   wherein said circumferential edges of said first and second portions are free and unattached to any other structure;
   a hinge coupled to outer surfaces of adjacent ends of said circumferential edges of said first and second portions of said cover member for pivotally connecting said second portion to said first portion;
   a plurality of lines of weakness concentrically arranged about said stem hole so as to form a plurality of expansion sections, each line of weakness being continuous and without intervals of non-weakness, said plurality of lines of weakness being evenly spaced apart between said stem hole and said circumferential edges of said first and second portions;
   wherein each line of weakness has a terminal end that is exposed, accessible, and immediately adjacent a respective linear edge of respective first or second portions when said first and second portions of said cover member are at said open configuration such that a respective line of weakness is completely severable and an associated expansion section is removable;
   wherein said linear edges of said first and second portions include complementary flanges that selectively secure said first portion to said second portion at said closed configuration, a respective complementary flange being positioned at a respective line of weakness terminal end; and
   wherein each of said first and second portions of said cover member defines a plurality of spaced apart apertures for allowing water to pass therethrough, each of said plurality of apertures being immediately adjacent a next aperture, a portion of said plurality of apertures being situated between but not in contact with each successive lines of weakness.

2. The soil protection device as in claim 1 wherein each of said first and second portions of said cover member includes a generally hemispherical configuration such that said cover member presents a disk-shaped configuration at said closed configuration.

3. The soil protection device as in claim 1 wherein successive lines of weakness may be completely severed, whereby to successively enlarge the diameter of said stem hole.

4. The soil protection device as in claim 1 wherein said cover member includes a construction from a plastic material.

5. The soil protection device as in claim 1 wherein said cover member is a metal grate.

6. The soil protection device as in claim 1 wherein said first portion of said cover member is pivotally connected to said second portion.

7. The soil protection device as in claim 1, further comprising a latch assembly attached to said outer surfaces of said peripheral edges of said first and second portions opposite said hinge, said latch assembly being movable between secured and unsecured configurations so as to maintain said cover member in said open and closed configurations, respectively.

8. The soil protection device as in claim 1, wherein said hinge is generally positioned at an intersection between a respective circumferential edge and respective linear edge of said first and second portions.

* * * * *